United States Patent Office 2,742,369
Patented Apr. 17, 1956

2,742,369

CORROSION INHIBITING COMPOSITION AND METHOD OF USING SAME

George B. Hatch, Allison Park, Pa., assignor to Calgon, Incorporated, a corporation of Pennsylvania No Drawing. Application May 12, 1954,
Serial No. 429,403

10 Claims. (Cl. 106—14)

This invention relates in general to inhibiting the corrosion of both cuprous and ferrous metals by aqueous solutions where both of these metals and/or their alloys are in contact with water or aqueous solutions.

It relates in particular to a method of reducing or completely preventing the interference by certain copper corrosion inhibitors with the protective action of certain corrosion inhibitors that have been considered extremely effective in retarding the corrosion of iron and steel.

For many years it has been the practice to add small amounts of molecularly dehydrated phosphates to water which is in contact with iron and steel pipes, fittings, and the like so that corrosion is held to a minimum. This process of retarding the corrosion of iron and steel is described fully in U. S. Patent 2,337,856 of which I am a co-inventor. The methods therein disclosed have been extensively practiced for a number of years, and most satisfactory results have been obtained in widely diversified applications of the methods.

In certain of these applications, as for example in the treatment of recirculating cooling tower waters, it has been found that the pH value of the water should preferably be maintained between about 5.0 and about 7.0 when the molecularly dehydrated phosphates are employed, because in this range the treatment seems to be most effective. In this pH range, pitting and tuberculation of the metal surfaces, and the deposition of undesirable calcium phosphates are minimized. The use of several parts per million of these phosphates in this type of treatment has proved to be extremely effective in systems constructed entirely of ferrous metals. However, it is the usual practice to construct many parts of modern systems for handling water and aqueous solutions from a number of other metals, particularly copper and its alloys which are widely used in fabricating heat exchanger tubes, valves, pumps, etc. At the same time, it will ordinarily be unnecessary to use these non-ferrous metals for pipe lines and other parts of the system where the less expensive ferrous metals are usually quite satisfactory absent any highly corrosive materials. When phosphate treatment is used in such systems where, for example, the heat exchangers are equipped with tubes of copper or its alloys, such as brass, bronze, admiralty, or other alloys of copper, serious pitting of the ferrous metals in the system is generally encountered if the pH value of the system drops much below 7.0. Careful investigation has established the fact that pitting of the iron and steel tubes seemed to result from the fact that the water picked up traces of copper from the copper or copper alloy tubes, when pH values in the vicinity of 6.7 or less were maintained. Apparently a small amount of copper dissolves in the water and plates out on the surface of the ferrous metals in accordance with well-known chemical reactions. This plating out results in the formation of localized galvanic cells and these cells in turn cause serious pitting and eventual deterioration of the equipment.

A pH value of about 7.0 has been found to be the upper limit for optimum inhibition of attack upon iron and steel when using one of the most effective phosphates which is known as commercial sodium hexametaphosphate, i. e. a molecularly dehydrated phosphate having a molar ratio of $Na_2O$ to $P_2O_5$ of about 1.1:1. When this particular phosphate is used in treating a water which comes in contact with copper, the pick-up of copper by the water becomes appreciable when the pH is 6.7 or less. Thus the optimum pH range where both steel and copper are present, is extremely narrow, being from about 6.7 to about 7.0. Maintenance of the pH of an aqueous system within this narrow range is almost out of the question, particularly since cooling waters are virtually unbuffered in this region, and the dissolved copper can build up to a significant value quite rapidly if the pH falls below 6.7. It has been found that the presence of as little as 0.1 p. p. m. of copper in a recirculating water is sufficient to cause appreciable interference with the normal protection generally conferred upon ferrous metals by the molecularly dehydrated phosphates.

In fact, such low concentrations of dissolved copper will often occur where no appreciable corrosion of the copper equipment is observable. Thus it will be seen that "corrosion" of copper in the general sense of the word is not a prerequisite to interference with the effectiveness of the molecularly dehydrated phosphates in retarding the corrosion of iron and steel.

The copper usually is deposited from the aqueous solution in a dark powdery form and is loosely adherent to the steel. Corrosion of the steel seems to proceed beneath the deposit and it gives the appearance of raising the coating of copper in small tubercules. The aqueous solution seemingly is able to seep through the porous copper deposit thereby permitting galvanic attack of the underlying steel to proceed. Apparently the molecularly dehydrated phosphates do not diffuse through the porous copper deposits to a sufficient degree to form a phosphate film upon the underlying surface, with the net result that the galvanic cell is set up in such a position that the phosphate does not have access to the surfaces where protection is needed.

As has been pointed out heretofore, maintenance of the pH of an industrial water system within a narrow range such as from about 6.7 to about 7.0 is virtually impossible even when elaborate controlling means are incorporated into the system. The pH will often drop below 6.7 and it will likewise increase beyond 7.0, with undesirable and often costly results in either case. I have now found that the corrosion of both cuprous and ferrous metals in one system can be reduced to a negligible degree at pH values considerably below 6.7, in fact even below 5.0 by the use of thiols of thiazoles, oxazoles, or imidazoles, which are effective in retarding the corrosion of copper and its alloys, along with the molecularly dehydrated phosphates which exert their well-known effect upon the ferrous metals, provided a certain further step is taken which will be more fully described hereinafter. When the thiols are used in conjunction with a molecularly dehydrated phosphate, for some unknown reason they interfere with the protective action of the phosphates on ferrous metals. Thus the use of these organic compounds with molecularly dehydrated phosphates has always been found heretofore to be entirely unsuitable where cuprous and ferrous metals are encountered in a single system. Although corrosion of the copper is inhibited, the ferrous metals are not suitably protected by the combination of these specific inhibitors.

I have found surprisingly enough that zinc salts counteract this interference of the thiols upon the protection of steel by any of the molecularly dehydrated phosphates disclosed in Rice and Hatch Patent 2,337,856 for the protection of ferrous metals. Thus I have discovered that a mixture of zinc salts with a thiol (or thiols) of a thiazole, oxazole, or imidazole can be used very successfully in conjunction with any of those molecularly dehydrated phosphates which are used to retard corrosion of iron and steel, without any adverse effect upon the protection of copper and its alloys by the thiols. Combining a zinc salt, a thiol, and a molecularly dehydrated phosphate permits operation throughout the entire optimum pH range of from about 5.0 to about 7.0, which I have explained is the desirable range, for the maximum protection of iron and steel against corrosion. As a practical matter, there are no particular operational problems in controlling the pH over this range as there are in the case of the very narrow pH range hereinbefore stated, i. e. 6.7 to 7.0. In addition, the combination of the three essential components can be used successfully even when the pH value is below 5.0 or above 7.0.

Broadly speaking, the organic portion of the inhibitor which I employ is a heterocyclic compound having a structure of one of its resonant forms in which a thiol or sulfhydryl (SH) group is attached to a carbon atom of the ring, said carbon atom being linked to a cyclic amino group. In this general class of compounds there are several materials which are quite effective in carrying out my invention, i. e. 2-mercaptobenzothiazole, 2-mercaptothiazole having the following structural formula

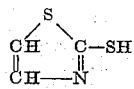

2-mercaptobenzoxazole having the following structural formula

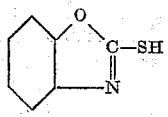

and 2-mercaptobenzimidazole having the following structural formula

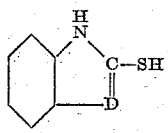

Obviously, the above are cited only by way of example, it being understood that any one of a number of similar compounds in the group are effective in my process of preventing corrosion of both copper and ferrous metals in a single system by the concurrent usage of zinc compounds to inhibit the interference of the thiol with the action of the phosphate.

In accordance with the preferred embodiment of my invention, I employ that amount of molecularly dehydrated phosphate which under the conditions of use will cause the formation of a film of a complex calcium phosphate on the ferrous metals which are present in the system. The amount of molecularly dehydrated phosphate which I use does not exceed 2 formula weights for each formula weight of calcium present in the water. I may use as little as 0.1 p. p. m. of phosphate or as much as 2 formula weights of phosphate for each formula weight of calcium present in the water. Generally speaking, the particular phosphate employed and the concentration of that phosphate will follow the teachings of U. S. Patent 2,337,856.

As for the zinc salts, I may employ any water soluble zinc compound such as zinc sulfate, zinc chloride, zinc nitrate, zinc acetate, etc. including even relatively insoluble zinc compounds such as zinc oxide, or any zinc compound which will go into solution under the conditions of use. I may add the zinc salt separately, either dry or in solution, the latter being preferable, or it may be incorporated with the phosphate by fusing a suitable zinc compound with the phosphate to form a zinc-containing phosphate glass. Alternatively, the zinc compound may be reacted with the thiol itself to form a zinc thiol which is added to the water by suitable means. The particular molecularly dehydrated phosphate which I employ can be either rapidly soluble in water or it can be a slowly soluble material such as listed in several earlier patents which have been granted to me including U. S. Patents 2,539,305 and 2,601,395. I do not limit myself to any specific phosphates since any phosphate capable of exerting an inhibitory effect upon the corrosion of ferrous metal can be employed.

While the weight ratio of zinc (as elemental zinc) to molecularly dehydrated phosphate is not critical, I prefer to maintain the weight ratio of zinc to phosphate between 0.02:1 and 0.25:1. The weight ratio of elemental zinc to the mercaptobenzothiazole (or other organic compound which I employ) broadly will fall in a preferred range of about 1:4 to about 1:1. I may even employ either smaller or larger amounts of zinc, and can use a weight ratio of zinc to mercaptobenzothiazole (or related organic compounds) as low as 1:25 or as high as 5:1 or even 10:1. In any event, I regard 0.1 p. p. m. zinc as the minimum concentration which I would use under normal circumstances.

The organic compounds which I use are generally not readily soluble in water. I prefer to introduce them into the water as a slurry, usually with a small amount of sodium carbonate or a surface active agent added to improve their wettability. I may feed the mixed corrosion inhibitor continuously or the materials may be fed intermittently depending upon the circumstances of the case. Alternatively, I may feed one part of the mixture continuously and the balance of the mixture intermittently, as for example the phosphate-zinc part of the mixture can be fed continuously while the organic compound can be added at intervals. I have observed that the thiols seem to form a protective film on the copper which adheres quite tenaciously, so that a continuous feed is not necessary to prevent corrosion of the copper and subsequent pickup of copper by the water.

Advantages of this invention are illustrated by the following examples. The specific compounds and their concentrations are presented as being typical and should not be construed to unduly limit the invention.

EXAMPLE I

Cold-rolled, low carbon steel strips approximately 1½ x 1½ inches in size were immersed for five (5) days in Pittsburgh city tap water at 35° C. in beakers with continuous agitation provided by lateral movement of the steel plates back and forth through one liter of the water at a rate of 32 cycles per minute. The steel plates were mounted at an angle of 45° with respect to the plane of lateral motion and moved through a distance of approximately two (2) inches. The phosphate used was "Calgon" brand sodium hexametaphosphate (molar ratio of $Na_2O$ to $P_2O_5$ of 1.1 to 1) and the zinc was added as $ZnSO_4$. The following data was obtained:

Table 1

| Phosphate in p. p. m. | 2-Mercapto-benzothiazole in p. p. m. | Zinc in p. p. m. (As ZN++) | Wt. Loss, mg./dm.²/day | |
|---|---|---|---|---|
| | | | at pH 5.5 | at pH 6.5 |
| 25 | 0 | 0 | 8.2 | 11.0 |
| 25 | 2 | 0 | 15.9 | 15.4 |
| 25 | 5 | 0 | 21.2 | 64.5 |
| 25 | 2 | 0.5 | 6.7 | 7.5 |
| 25 | 2 | 2 | 5.5 | 3.5 |
| 25 | 2 | 5 | 4.2 | 2.4 |
| 25 | 5 | 0.5 | 8.9 | 7.3 |
| 25 | 5 | 2 | 6.0 | 5.2 |
| 25 | 5 | 5 | 4.6 | 2.9 |

A further illustration of the efficacy of zinc salts in counteracting the interference by the thiols with the protective action of the molecularly dehydrated phosphates toward steel can be shown by current flow tests in differential aeration cells with steel electrodes. Differential aeration cells are one of the commonest sources of corrosion acceleration encountered in practice and may be set up by accumulation of silt, porous scale, corrosion products, and miscellaneous debris upon portions of the metal surface. The differential aeration cells consisted of two 2 x 2¼ inch cold-rolled, low carbon steel plates, one of which was wrapped in Whatman No. 120 paper in order to restrict access of oxygen to this electrode. The two plates were mounted with their plane surfaces parallel and separated by a distance of ½ inch. The backs of each panel were covered with plastic insulative tape in order to obtain more uniform current densities upon the adjacent exposed surfaces. The data in Table II shows the influence of a zinc-bearing phosphate glass, as compared to a sodium phosphate glass, upon the current developed by a differential aeration cell with steel electrodes immersed in Pittsburgh tap water at 35° C. at two 2-mercaptobenzothiazole concentrations.

*Table II*

Current after
24 hr. (Milliamperes)

50 p. p. m. 1.1 $Na_2O \cdot P_2O_5$ glass +:
   (a) 5 p. p. m. 2-mercaptobenzothiazole____ 0.36
   (b) 10 p. p. m. 2-mercaptobenzothiazole____ 0.89
50 p. p. m. 1.13 $Na_2O \cdot 0.376$ $ZnO \cdot P_2O_5$ +:
   (a) 5 p. p. m. 2-mercaptobenzothiazole____ 0.03
   (b) 10 p. p. m. 2-mercaptobenzothiazole____ 0.025

The high current from the cells with the glassy phosphate and 2-mercaptobenzothiazole treated water shows that the corrosion acceleration due to differential aeration has proceeded at a significant rate. The current from the cells with the zinc-bearing glassy phosphate and 2-mercaptobenzothiazole treated water shows a very low current which indicates that corrosion due to differential aeration has been stifled to a marked extent.

This invention, as in the case of the invention disclosed in U. S. Patent 2,337,856, hereinbefore mentioned, is particularly applicable for preventing corrosion by water which contains small amounts of bicarbonate hardness. Inasmuch as I am using both the thiols which are specifically effective in reducing the corrosion of copper and cuprous metals, and the molecularly dehydrated phosphates which are effective in reducing the corrosion of ferrous metals under those conditions wherein a protective film of calcium molecularly dehydrated phosphate is deposited upon the surface of the ferrous metal, it will be understood by those skilled in the art that I am treating waters which have a zero or negative coefficient according to the well-known Langelier index referred to in an article by W. F. Langelier in "The Journal of American Water Works Association" 28:1500 (1936). The index gives a measure of the tendency of the water to lay down a protective film of calcium carbonate on metals and takes into consideration the temperature of the water, its alkalinity, calcium content, carbonate and bicarbonate contents. Waters which have a negative Langelier coefficient will dissolve deposits of calcium carbonate, whereas those having a positive coefficient will deposit calcium carbonate. Those which have a zero coefficient will neither lay down nor dissolve calcium carbonate deposits.

By the term "molecularly dehydrated phosphate" it should be understood that I mean any phosphate which can be considered as derived from a monobasic or dibasic orthophosphate, or from orthophosphoric acid, or from a mixture of any two of these by elimination of water of constitution therefrom. I may use alkali metal tripolyphosphates or pyrophosphates or the metaphosphate which is often designated as hexametaphosphate. In carrying out my invention by the use of any of these phosphates, only such a small amount of them is used as will produce a film of calcium molecularly dehydrated phosphate and not such an amount as will cause the redissolving of such a film. Broadly speaking, I may use any molecularly dehydrated phosphate but I prefer to use those which have a molar ratio of alkali metal to phosphorus pentoxide of from about 0.9 to 1 to about 2 to 1, the latter being the alkali metal pyrophosphate. While I prefer to use the molecularly dehydrated phosphates such as the metaphosphates, pyrophosphates, or polyphosphates of sodium, these being the least expensive and most readily available, I may use the molecularly dehydrated phosphates of other metals such as potassium, lithium, cesium, or rubidium, or the ammonium molecularly dehydrated phosphates which in many instances are classified as being alkali metal phosphates, or the alkaline earth metal molecularly dehydrated phosphates such as those of calcium, barium, or strontium, or the mixed alkali-metal and alkaline earth metal molecularly dehydrated phosphates.

It should be borne in mind that the essential requirement insofar as the phosphate portion of my inhibiting mixture is concerned, is that the water which is being treated be supplied with a molecularly dehydrated phosphate radical, and so far as preventing or retarding corrosion of the ferrous metal is concerned, any material which will supply such phosphate radical may be employed. This is made abundantly clear in U. S. Patent 2,337,856 of which the foregoing disclosure is essentially a part thereof. By reference to this prior patent it is my express intention to incorporate all portions of the teachings therein set forth as they relate to the conditions surrounding the use of those phosphates capable of protecting metals against corrosion and as they relate to the phosphates which are employed.

It should be understood that although the molecularly dehydrated phosphates alone are of some value in retarding the corrosion of copper (see page 4, column 1, lines 6–11 of the prior patent 2,337,856) the thiols of the preferred compounds I have herein mentioned are much more effective per se in retarding copper corrosion. Because of the high degree of specific efficiency of each of these two classes of inhibitors, and the incompatability of the two, that until my discovery they could not suitably be used in a single system where both ferrous and cuprous metals were present.

Having thus described my invention, what I claim as new and desire to be secured by Letters Patent is:

1. A method of retarding the corrosion of both ferrous metals and cuprous metals which are in contact with water which comprises adding to water which is corrosive to both metals and contains insufficient calcium and carbonate ion to deposit calcium carbonate under the conditions in which the water is present, (a) a thiol of a compound selected from the group consisting of thiazoles, oxazoles, and imidazoles, (b) a molecularly dehydrated phosphate which under the conditions present is capable of exerting a protective effect upon the ferrous metals, and (c) a zinc compound which under the conditions present is soluble in said water.

2. The process of retarding the corrosion of both cuprous and ferrous metals by calcium-containing water which is corrosive under the conditions of use to both metals and contains insufficient calcium and carbonate ion to deposit calcium carbonate under the conditions in which the water is present, which comprises adding to said water (a) a molecularly dehydrated phosphate in amount which is sufficient to form on the ferrous metal a protective film of a compound containing calcium and molecularly dehydrated phosphate radical, (b) a thiol of a compound selected from the group consisting of thiazoles, oxazoles, and imidazoles in sufficient amount which under the conditions of use is capable of retarding the corrosion of the cuprous metal and (c) a water-soluble zinc compound in sufficient amount that corrosion of both the cuprous and ferrous metal is effectively retarded.

3. The process of retarding the corrosion of both cuprous and ferrous metals by calcium-containing water which is corrosive to both cuprous and ferrous metal which comprises adding to said water having a negative or zero coefficient according to the Langelier index, (a) molecularly dehydrated alkali-metal phosphate in amount which is substantially less than the stoichiometric amount required to form the soluble complex of calcium and molecularly dehydrated phosphate, (b) a thiol of a compound selected from the group consisting of thiazoles, oxazoles, and imidazoles, and (c) a zinc compound water soluble under conditions of use in an amount sufficient to provide at least 0.1 part per million of zinc in said water.

4. The method as described in claim 3 where (a) is a molecularly dehydrated alkali-metal phosphate having a molar ratio of alkali-metal to phosphorus pentoxide of from about 0.9 to 1 to about 2 to 1, (b) is a thiol selected from the group consisting of 2-mercaptobenzothiazole, 2-mercaptobenzoxazole, 2-mercaptothioazole, and 2-mercaptobenzimidazole, and (c) is a water-soluble zinc compound selected from the group consisting of zinc sulfate, zinc chloride, zinc nitrate, zinc acetate, and zinc oxide.

5. The process of retarding the corrosion of both cuprous and ferrous metals in contact with water which contains insufficient calcium and carbonate ion to deposit calcium carbonate under the conditions in which the water is present which comprises adding to the water (a) molecularly dehydrated alkali-metal phosphate in an amount between 0.1 part per million parts of water and not in excess of 2 formula weights for each formula weight of calcium in the water, (b) a thiol of a compound of the group consisting of thiazoles, oxazoles, and imidazoles, and (c) a water-soluble zinc compound, the weight ratio of the elemental zinc of (c) to (a) being from about 0.02 to 1 to about 0.25 to 1, and the weight ratio of the elemental zinc of (c) to (b) being from about 1 to 25 to about 10 to 1.

6. The process of retarding the corrosion of both cuprous and ferrous metals in contact with water, which comprises adding to the water which is corrosive to both metals and contains insufficient calcium and carbonate ion to deposit calcium carbonate under the conditions in which the water is present (a) molecularly dehydrated phosphate of a polyvalent metal in an amount which is sufficient to form on the ferrous metal a protective film of a molecularly dehydrated phosphate containing said polyvalent metal, (b) a thiol of a compound selected from the group consisting of thiazoles, oxazoles, and imidazoles, and (c) a zinc compound which under the conditions present is soluble in said water.

7. A corrosion inhibitor which is capable of protecting both ferrous and cuprous metals from the corrosion by a water which is calcium-containing but contains insufficient calcium ion and carbonate ion to deposit calcium carbonate under the conditions in which the water is present, said inhibitor consisting essentially of (a) a molecularly dehydrated phosphate, (b) a thiol of a compound selected from the group consisting of thiazoles, oxazoles, and imidazoles, and (c) a water-soluble zinc compound.

8. A corrosion inhibitor as described in claim 7 wherein (a) is an alkali-metal molecularly dehydrated phosphate having a ratio of alkali-metal to phosphorus pentoxide of from about 0.9 to 1 to about 2 to 1, (b) is a thiol selected from the group consisting of 2-mercaptobenzothiazole, 2-mercaptobenzoxazole, 2-mercaptothiazole, and 2-mercaptobenzimidazole, and (c) is a water-soluble zinc compound selected from the group consisting of zinc sulfate, zinc chloride, zinc nitrate, zinc acetate, and zinc oxide.

9. A corrosion inhibitor as described in claim 7 where the weight ratio of the elemental zinc contained in (c) to (a) is from about 0.02 to 1 to about 0.25 to 1 and the weight ratio of the elemental zinc of (c) to (b) is from about 1 to 25 to about 10 to 1.

10. A method of preventing corrosion of copper and steel in contact with water which comprises adding to the water a composition consisting essentially of (a) a thiol of a compound selected from the group consisting of thiazoles, oxazoles, and imidazoles, (b) a molecularly dehydrated phosphate which under the conditions present is capable of exerting a protective effect upon steel, and (c) a zinc compound which under the conditions present is soluble in water, said zinc compound being present in a concentration of at least 0.1 part of zinc per million parts of water.

References Cited in the file of this patent

UNITED STATES PATENTS

| 2,384,553 | Kiffer | Sept. 11, 1945 |
| 2,442,581 | Bishop | June 1, 1948 |

FOREIGN PATENTS

| 625,065 | Great Britain | June 21, 1949 |